July 28, 1942.　　　F. H. LE JEUNE　　　2,291,394
METHOD OF FORMING RIMS
Filed Dec. 4, 1939　　　2 Sheets-Sheet 1

INVENTOR.
FRANK H. LE JEUNE
BY
ATTORNEYS

July 28, 1942.  F. H. LE JEUNE  2,291,394

METHOD OF FORMING RIMS

Filed Dec. 4, 1939  2 Sheets-Sheet 2

INVENTOR.
FRANK H. LEJEUNE
BY
ATTORNEYS

Patented July 28, 1942

2,291,394

UNITED STATES PATENT OFFICE 2,291,394

METHOD OF FORMING RIMS

Frank H. Le Jeune, Detroit, Mich., assignor to Kelsey-Hayes Wheel Company, Detroit, Mich., a corporation of Delaware Application December 4, 1939, Serial No. 307,502

2 Claims. (Cl. 29—159.1)

The invention relates to the manufacture of tire rims and refers more particularly to the manufacture of tire rims of non-symmetrical cross section.

The invention has for an object to form a tire rim of non-symmetrical cross section in such a manner that the desired radial dimensions of the rim member can be accurately secured.

The invention has for another object to provide an improved method of forming a tire rim of the felloe type in which an annular channel forms a felloe integral with the tire receiving part of the rim.

These and other objects of the invention will become apparent from the following description, taken in connection with the accompanying drawings, in which Figure 1 is an elevation of a tire rim manufactured in accordance with my invention;

Figures 2 and 3 are cross sections on the lines 2—2 and 3—3, respectively, of Figure 1;

Figure 1:
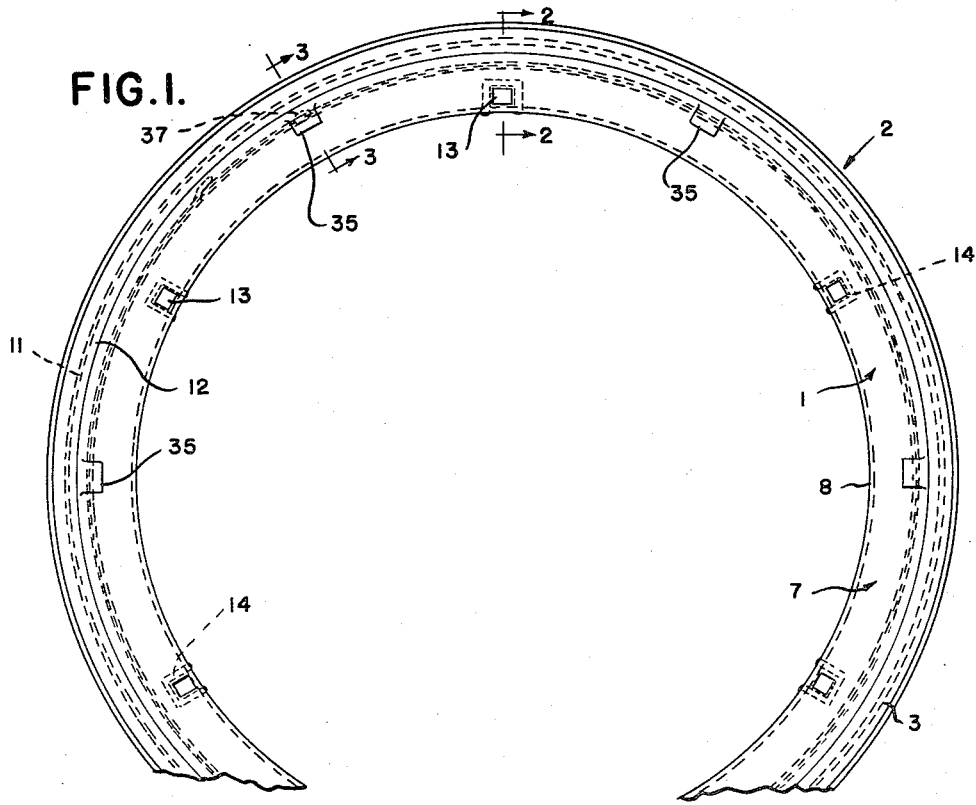
Figure 2:
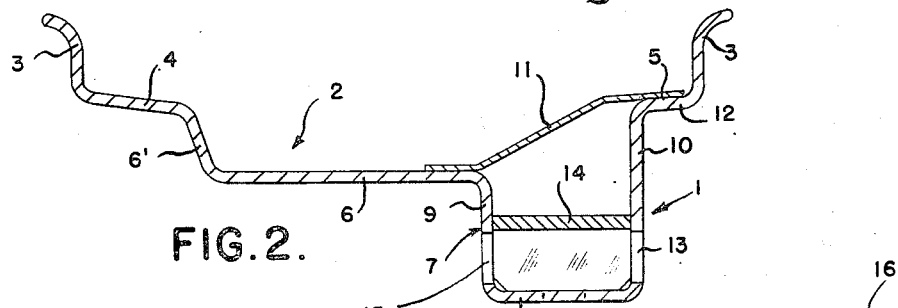
Figures 3, 4, 5:
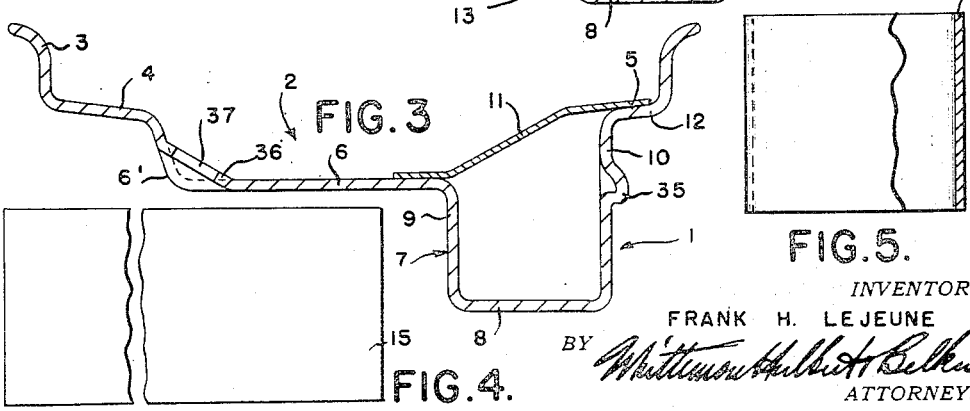
Figure 4 is a plan view of a strip used in the manufacture.
Figures 5, 6, 7 and 8 are cross sections illustrating successive steps in the manufacture.

The invention is particularly applicable to the manufacture of tire rims of the felloe type, as illustrated in Figures 1, 2 and 3, in which 1 is the felloe and 2 the tire receiving part of the rim. The rim has the tire retaining flanges 3 at its edges, the lateral tire bead seats 4 and 5 of the same radial dimensions, the base portion 6 of smaller radial dimensions than the bead seats and connecting into the bead seat 4, and the channel 7 connecting into the base portion 6 and leading to the bead seat 5. The channel forms the felloe and has the base 8, which is of smaller radial dimension than the base portion 6 and the sides 9 and 10 connecting into the base portion 6 and leading to the bead seat 5, respectively. The channel is closed by the metal band 11 which is formed separately and has one edge secured to the base portion 6 and the opposite edge secured to the lateral portion 12 which is integral with and extends between the side 10 and the adjacent tire retaining flange 3. Preferably, the edges of the band are welded to the base portion and lateral portion and the ends of the band overlap. The lateral portion 12 has smaller radial dimensions than the lateral portion forming the bead seat 4 so that when the band is secured in place its edge portion which is secured to the lateral portion 12 may have the same radial dimensions as the bead seat 4. The band 11, the base portion 6 and the generally radial portion 6' form the well of the rim. The channel is provided with the peripherally spaced openings 13 in its sides 9 and 10 for the passage of suitable means, such as bolts, for mounting the rim upon a wheel body. For reinforcing the channel and preventing its collapse upon tightening up of the securing nuts on the bolts, there are the U-shaped spacers 14 having the ends of their legs riveted to the base 8 of the channel and positioned so that their legs and bases are adapted to extend around the securing bolts.

In the manufacture of the tire rim, a rectangular metal strip 15, illustrated in Figure 4, is bent into substantially circular form and its ends fixedly secured to each other as by being welded to form an annular rim blank 16, illustrated in Figure 5. This blank has an average diameter equal to that of the base 8 of the channel of the completed rim.

Figure 6:
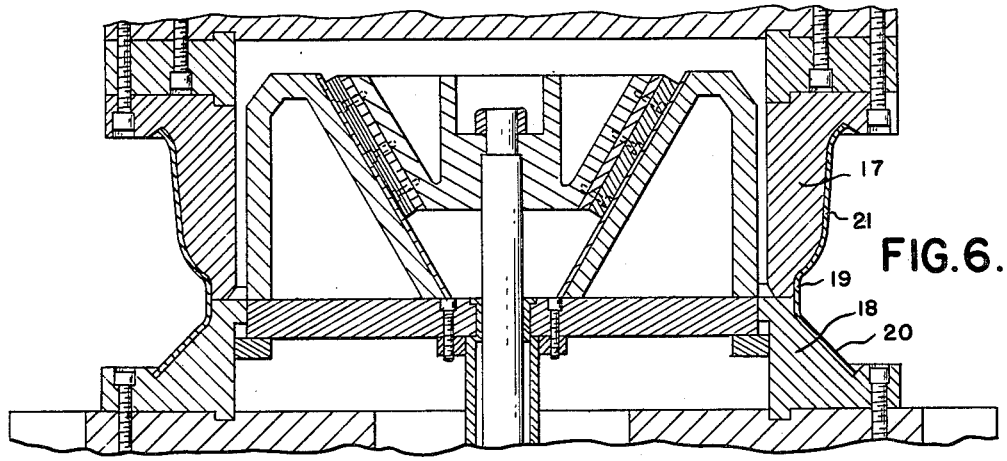

The annular rim blank is trued into cylindrical form and while held in this cylindrical form it is subjected to a die-pressing step, as illustrated in Figure 6, in which the dies 17 and 18 are relatively moved toward each other into engagement with the inner surface of the blank and differentially expand the portions of the rim blank on opposite sides of the portion 19 for forming the base 8 of the channel of the completed rim. The portion 20 at one side of the portion 19 preferably has a straight-line flare and is expanded to a greater extent than the portion 21 on the other side of the portion 19. During this first die-pressing step the rim blank is preferably not subjected to any external restraint.

Figure 7:
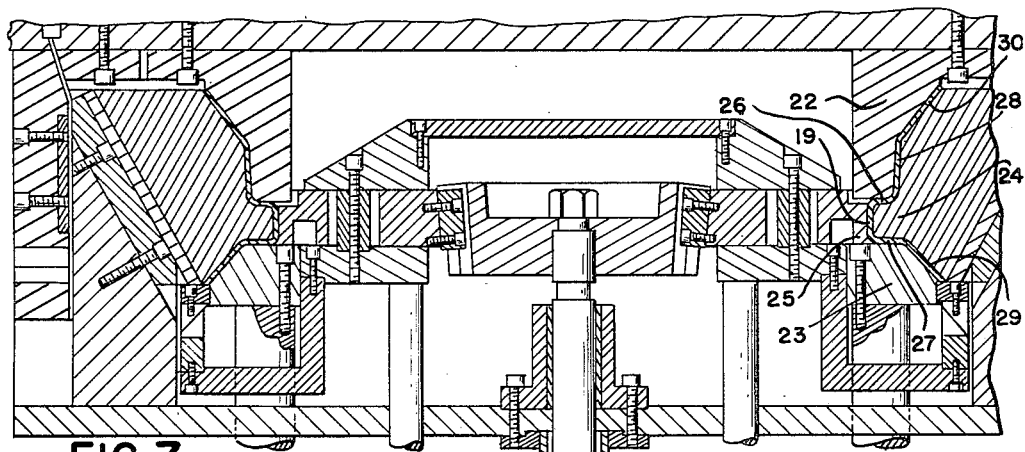

The next step comprises the die-pressing step illustrated in Figure 7, in which the internal dies 22 and 23 are relatively moved toward each other while the portion 19 is both externally and internally restrained by the external and internal confining members 24 and 25, respectively. Then while the diameter of the portion 19 is being maintained, the dies fashion the previously expanded portions 20 and 21 to rough-form the sides 26 and 27 of the channel and the base portion 28 and to further expand the parts 29 and 30 preferably on straight-line flares beyond the rough-formed side 27 and the base portion 28, respectively. The external confining member 24 also cooperates with the dies 22 and 23 in rough-forming the sides of the channel.

Figure 8:
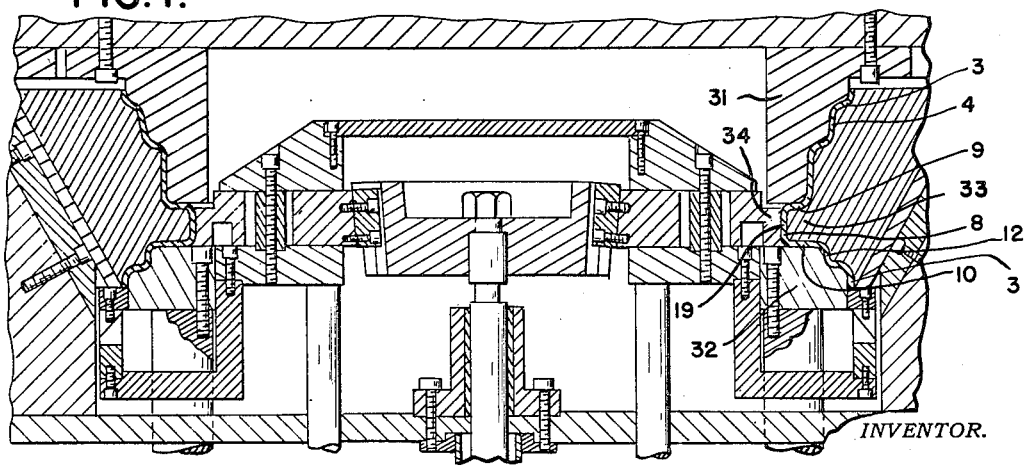

After the second die-pressing step, the rim blank is then subjected to a final die-pressing step, illustrated in Figure 8, in which the internal dies 31 and 32 are relatively moved toward each other while the portion 19 of the blank is positively held from change by the external and internal confining members 33 and 34, respectively. During this die-pressing step the previously rough-formed sides 26 and 27 of the channel and base portion 28 and also the expanded parts 29 and 30 are finish-formed into the base 8 and the sides 9 and 10 of the channel, the base portion 6, the lateral portions 4 and 12, and the tire retaining flanges 3. The external confining member 33 restrains the blank throughout its whole cross sectional contour during the third and final die-pressing step.

After the third die-pressing step, the base 8 of the channel is pierced to form the holes for receiving the ends of the legs of the U-shaped spacers 14, the side 10 of the channel is operated upon to form the projections 35 for centering the rim upon a wheel body, and the portions of the rim member at the junction of the base portion 6 and the generally radial portions 6' is depressed and pierced to form the depression 36 and the valve stem hole 37. The spacers 14 are then riveted to the base of the channel. The rim is then completed by assembling the band 11 with the rim member and welding the edges of the band to the base portion 6 and the lateral portion 12.

The band before assembly is a transversely split annulus which is formed from a thin flat rectangular metal blank of a length to provide for the overlap of the ends of the band of the completed rim. This blank is bent into circular form and its ends welded together, after which it is subjected to a die-pressing step. The die-pressing expands the portion of the blank beyond the edge to be secured to the base portion 6 of the rim into an intermediate straight-line flared part and an edge radially offset from the other edge to rest on and be secured to the lateral portion 12 of the rim. After the die-pressing step the blank is transversely split by a suitable severing step.

What I claim as my invention is:

1. In a method of forming a tire rim member, the steps of fashioning and thereby expanding the portions of a hoop on opposite sides of a portion which later forms the base of a channel while holding the diameter of the channel base forming portion substantially unchanged, fashioning the expanded portions to approximately finish-form the side walls of the channel and a generally axial portion extending from one of the side walls and further expand portions axially beyond and extending from the generally axial portion and the other of the side walls while maintaining the diameter of the channel base forming portion substantially unchanged, and then fashioning the further expanded portions to form axially spaced generally axial portions spaced radially outwardly from the previously formed generally axial portion and generally radial tire retaining flanges connected to the last formed generally axial portions while holding the diameter of the channel base forming portion substantially unchanged, one of the last mentioned generally axial portions constituting a tire bead seat and the other of the last mentioned generally axial portions being adapted to support a band having a part constituting a tire bead seat.

2. In a method of forming a tire rim member, the die-pressing steps of expanding the portions of a hoop on opposite sides of a portion which later forms the base of a channel, fashioning the expanded portions to approximately finish-form the side walls of the channel and a generally axial portion extending from one of the side walls and further expand portions axially beyond and extending from the generally axial portion and the other of the side walls, and fashioning the further expanded portions to form axially spaced generally axial portions spaced radially outwardly from the previously formed generally axial portions and generally radial tire retaining flanges connected to the last mentioned generally axial portions, and during the three die-pressing steps substantially maintaining the diameter of the channel base forming portion.

FRANK H. LE JEUNE.